United States Patent

Oftedahl

[15] 3,635,736
[45] Jan. 18, 1972

[54] FLAVORING FOOD WITH A SUGAR DIALKYL DITHIOACETAL

[72] Inventor: Marvin L. Oftedahl, Warson Woods, Mo.
[73] Assignee: Monsanto Company, St. Louis, Mo.
[22] Filed: Oct. 11, 1968
[21] Appl. No.: 766,954

[52] U.S. Cl. ...............99/140 R, 99/105, 99/124, 260/609 A
[51] Int. Cl. .................A23l 1/26, C07c 149/00
[58] Field of Search .................99/140; 260/609 A

[56] References Cited

OTHER PUBLICATIONS

C.A. 59:10738C (1963).

Primary Examiner—Joseph Scovronek
Assistant Examiner—Sidney Marantz
Attorney—Neal E. Willis and John E. Maurer

[57] ABSTRACT

Method of imparting flavors and/or enhancing the flavors of food products by the addition of a small amount of a sugar dialkyl dithioacetal to said food products.

25 Claims, No Drawings

FLAVORING FOOD WITH A SUGAR DIALKYL DITHIOACETAL

This invention relates to flavoring agents. More particularly, it relates to agents for imparting flavor to food products, to flavoring compositions containing such agents, and to food products flavored therewith.

Although the present invention is of interest for imparting flavor to food products, the invention may also be used in improving the already-present flavor of such products. The term "imparting flavor," as employed herein, includes therefore, not only providing flavor but also enhancing the flavor of substances already having some degree of flavor.

There is presently a real need for the introduction of moderately priced flavor enhancers and flavors in the food industry. The well-known flavor enhancer monosodium glutamate and the more recently introduced 5'-nucleotides are relatively expensive. Existing commercial "synthetic" meat flavors (derived mainly from hydrolyzed vegetable protein) are inadequate in flavor and are relatively costly. Beef extract, the primary source of beef flavor, suffers from costliness, an unstable price, inconsistent quality and a fluctuating supply.

It has now been discovered that certain sugar dialkyl dithioacetals impart excellent flavors and flavor enhancement, when present in small amounts, to food products. In certain food products, such as meat or meatlike and vegetable or vegetablelike products, the sugar dialkyl dithioacetals of the present invention are particularly advantageous in imparting meatlike or vegetablelike flavors thereto.

The sugar dialkyl dithioacetals that have been found to possess this outstanding combination of properties are represented by the formula:

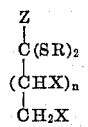

wherein R is selected from the group consisting of hydrogen and alkyl containing one to three carbon atoms, $n$ is an integer from 0 to 7, X is selected from the group consisting of hydrogen and hydroxyl wherein at least one X is hydroxyl, and Z is selected from the group consisting of hydrogen and — $CH_2OH$. The configuration of the mono- or polyhydroxy sugar moiety may be in the D, L or DL forms of the gluco, manno, galacto, ribo, xylo, arabino, erythro, threo and glycero forms of the corresponding sugars.

Of the compounds included within the above structural formula those wherein $n$ is 4, X is hydroxyl and Z is hydrogen are preferred. In particular D-glucose dimethyl dithioacetal is a preferred compound. Other sugar dialkyl dithioacetals of the above formula which can be used in accordance with this invention to impart of enhance flavors in food products include the following:

D-Glucose dimethyl dithioacetal
D-Galactose dimethyl dithioacetal
D-Mannose dimethyl dithioacetal
D-Xylose dimethyl dithioacetal
D-Erythrose dimethyl dithioacetal
D-Ribose dimethyl dithioacetal
D-Fructose dimethyl dithioacetal
L-Glucose diethyl dithioacetal
L-Xylose dimethyl dithioacetal
L-Arabinose dimethyl dithioacetal
L-Glycero-D-Mannoheptose dimethyl dithioacetal
D-Glycerose diethyl dithioacetal
D-Glucose diethyl dithioacetal
D-Galactose diethyl dithioacetal
D-Mannose diethyl dithioacetal
D-Xylose diethyl dithioacetal
D-Glucose di-n-propyl dithioacetal
D-Galactose di-n-propyl dithioacetal
D-Xylose di-n-propyl dithioacetal
D-Rhamnose dimethyl dithioacetal
D-Fucose dimethyl dithioacetal
2-deoxy-D-Ribose dimethyl dithioacetal
2-deoxy-D-Glucose dimethyl dithioacetal
Glycoladehyde dimethyl dithioacetal The compounds of the present invention can be used individually or mixed with each other. They can also be used simultaneously with other flavor imparting materials, such as monosodium glutamate, the 5'-nucleotides, protein hydrolysates, (which are employed as a convenient source of the principal amino acids of meat proteins), spices, garlic, smoked flavors, sugars, salts, aromatics such as capric acid and other fatty acids, thioaldehydes such as isovaleric thioaldehyde, ketones such as maltol, aldehydes such as propionaldehyde, phenols such as eugenol, and nitrogenous materials such as skatole and indole. The sugar dialkyl dithioacetals can be added, with or without other flavor imparting materials, to food products in various conventional seasoning forms such as powders or solutions.

It is a distinct advantage of the present invention that the compounds used herein not only impart a vegetable or meat flavor, but can be used in combination with other flavoring ingredients for specific effects. It is thus possible to obtain great flexibility in flavor, and to simulate and/or enhance the flavor of many specific types of meat. Additionally, the compounds used in the present invention impart other flavor notes to various food products and have an enhancing effect in that they improve the desirable flavor characteristics already present in the food products.

The present invention can be used to impart flavor to many types of food products including meat substitutes, soups, sauces, sandwich spreads, condiments and the like. The present invention is particularly of value in imparting flavor to food products wherein meat and/or vegetable flavors are desirable. For instance, in most soups a meat flavor is desirable and is readily imparted thereto by small amounts of sugar dialkyl dithioacetals. Likewise the flavors of vegetable juices are enhanced so as to make them more palatable to the consumer. An example of such a vegetable juice is a well known commercial juice, the major constituents of which are primarily tomato juice with other juices such as carrot, celery, beets, and water cress. To such a juice, D-galactose dimethyl dithioacetal is added in an amount of about 250 p.p.m. by weight of the juice. The resulting product has an agreeable, better blended taste, is distinctly more spicy, and has increased pepper and celery flavor, with less tomato flavor notes. In taste tests, it is preferred over the vegetable juice alone.

Another example of such a food product is a tomato juice. To such a juice, D-galactose dimethyl dithioacetal is added in an amount of about 500 p.p.m. by weight of the juice. The resulting product has an agreeable, better blended, distinctly less sour and more salty flavor. In taste tests it is preferred over the tomato juice alone.

The sugar dialkyl dithioacetals used in this invention, and processes for making them, are well known in the art. They can be prepared by reacting a monosaccharide with a suitable mercaptan. For example, D-glucose dimethyl dithioacetal can be prepared by heating substantially equivalent amounts of D-glucose and methyl mercaptan in the presence of hydrochloric acid. More detailed procedures for the preparation of various monosaccharide dialkyl dithioacetals are set forth in "The Carbohydrates-Chemistry, Biochemistry, Physiology," p. 226, edited by Ward Pigman, Academic Press, N.Y., 1957.

In general, the sugar dialkyl dithioacetals of this invention can be added in amounts up to about 0.5 percent by weight of the food produce as suits the individual taste. The preferred amount is in the range of about 0.01 percent to about 0.25 percent. It has been found that a concentration below about 0.01 percent is normally of little effect and above about 0.25 percent is palatable only to few individuals.

The following examples are given solely for purposes of illustration and are not to be considered as limiting the invention to these embodiments. Many modifications will be apparent to those skilled in the art without departing from the spirit or scope of the invention.

EXAMPLE I

A broth is prepared from a can of commercially available beef noodle soup by straining all solids, diluting with 1 can of water and heating to a simmer. Two cups of this broth are prepared; A and B. Cup A, containing 500 p.p.m. D-galactose dimethyl dithioacetal, is compared with a control (cup B) for preference and flavor by five randomly selected persons who are unaware of the added ingredient in cup A. Table I shows the results of this comparison.

TABLE I

| Person | Preference | Flavor |        |
|--------|-----------|--------|--------|
| 1      | Cup A     | More   | meaty, oniony |
| 2      | Cup A     | More   | celery, oniony |
| 3      | Cup A     | More   | meaty, onion + celery flavors |
| 4      | Cup A     | More   | meaty, vegetable |
| 5      | Cup A     | More   | meaty, cabbage |

It is obvious from the results shown in table I that the cup containing D-galactose dimethyl dithioacetal is preferred and has an improved meat and/or vegetable flavor.

EXAMPLE II

Five cups of warm beef stock are prepared containing ingredients as follows:
- Cup A—Control (Beef Stock)
- Cup B—500 p.p.m. D-Glucose dimethyl dithioacetal
- Cup C—500 p.p.m. D-Glucose dimethyl dithioacetal and 100 p.p.m. of a commercially available flavor enhancer containing 50 percent disodium 5'-guanylate and 50 percent disodium 5'-inosinate
- Cup D—500 p.p.m. D-Mannose dimethyl dithioacetal
- Cup E—500 p.p.m. D-Mannose dimethyl dithioacetal and 100 p.p.m. of a commercially available flavor enhancer containing 50 percent disodium 5'-guanylate and 50 percent disodium 5'-inosinate These cups are tested for preference and flavor comments by five randomly selected persons who are unaware of their ingredients other than that they are variously seasoned beef stocks. The results for preference and flavor are recorded for comparative purposes in tables II and III.

TABLE II

| Person | First | Preference (Cup) Second | Third | Fourth | Fifth |
|--------|-------|-------|-------|--------|-------|
| 1 | C | A | D | B,E | — |
| 2 | B | C | E | D | A |
| 3 | C | E | B | D | A |
| 4 | C | D | B | E | A |
| 5 | C | D | E | B | A |

TABLE III

| Person | Cup A | Cup B | Cup C | Cup D | Cup E |
|--------|-------|-------|-------|-------|-------|
| 1 | Control | Flat, drying | Sweetish, full | Oniony, flat | Cabbage. |
| 2 |  |  | Superior to control |  | Onion, garlic. |
| 3 | Beef stock | Medicinal | Stronger meat | Superior to control | Stronger meat. |
| 4 |  | More seasoning | Full, stronger meat | More meat | Less salty, onion. |
| 5 |  | More meat | do | Full onion | Onion. |

It is apparent from the data recorded in tables II AND III that beef stock which has been flavored with the compounds of this invention is preferred and has flavor characteristics which are desirable. It is, of course, understood that the personal taste reactions will vary with individuals, but collectively an improved food product is clearly provided.

EXAMPLE III

A broth is prepared from a can of commercially available beef noodle soup by straining of all solids, diluting with 1 can of water and heating to a simmer. Four cups of this beef noodle broth were prepared, containing ingredients as follows:
- Cup A—Control (Beef Noodle Broth)
- Cup B—500 p.p.m. D-Glucose dimethyl dithioacetal
- Cup C—500 p.p.m. D-Glucose dimethyl dithioacetal, and 100 p.p.m. of a commercially available flavor enhancer containing 50 percent disodium 5'-inosinate and 50 percent disodium 5'-guanylate
- Cup D—500 p.p.m. D-Mannose dimethyl dithioacetal These cups are tasted for preference and flavor comments by six randomly selected persons who are unaware of their added ingredients other than as variously seasoned beef broths. The results for preference and flavor are recorded for comparative purposes in tables IV and V.

TABLE IV

| Person | First | Preference (Cup) Second | Third | Fourth |
|--------|-------|-------|-------|--------|
| 1 | C | B | A | D |
| 2 | B | C | A | D |
| 3 | D | C | B | A |
| 4 | C | B | D | A |
| 5 | D | C | B | A |
| 6 | C | B | D | A |

TABLE V

| Person | Cup A | Cup B | Cup C | Cup D |
|--------|-------|-------|-------|-------|
| 1 | Control | Saltier | Full, sweet | Flat, oniony. |
| 2 |  | Fuller, rounder | Similar to B | Off note. |
| 3 |  | Sulfurous | More body | Intense flavor. |
| 4 | Beef noodle broth | Sweet, fuller, saltier | Sweeter, rounder | Garlic, sulfurous. |
| 5 |  | Meat flavor | Saltier, more beef flavor | Meat, onion, spicey. |
| 6 |  | Meaty and salty | Meaty, oniony | Oniony. |

As in the above examples the broths containing the sugar dialkyl dithioacetals are preferred and have enhanced flavors.

EXAMPLE IV

The procedure of example III was followed and two cups of beef noodle broth were prepared containing ingredients as follows:
Cut A—Control (Beef noodle broth)

Cup B—500 p.p.m. D-glucose dimethyl dithioacetal

These cups are tested for preference by eight randomly selected persons who are informed that cup A is the control. All prefer cup B.

EXAMPLE V

Following the procedure of example III, two cups of beef noodle broth are prepared containing ingredients as follows:

Cup A—Control (Beef noodle broth)
Cup B—250 p.p.m. D-glucose diethyl dithioacetal In a taste test for preference by six persons, two preferred cup A, two preferred cup B and two rated them the same.

While this invention has been described with respect to various specific examples and embodiments, it is to be understood that the invention is not limited thereto and that it can be variously practiced within the scope of the following claims.

I claim:

1. A method of imparting flavor to a food product comprising mixing with a food product a small amount of a sugar dialkyl dithioacetal of the formula:

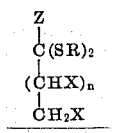

R is selected from the group consisting of hydrogen and alkyl containing one to three carbon atoms, $n$ is an integer from 0 to 7, X is selected from the group consisting of hydrogen and hydroxyl wherein at least one X is hydroxyl and Z is selected from the group consisting of hydrogen and $-CH_2OH$.

2. A method of claim 1 wherein $n$ is 4, X is hydroxyl and Z is hydrogen.

3. A method of claim 2 wherein R is methyl.

4. A method of claim 2 wherein R is ethyl.

5. A method of claim 2 wherein the sugar dialkyl dithioacetal is D-glucose dimethyl dithioacetal.

6. A method of claim 2 wherein the sugar dialkyl dithioacetal is D-glucose diethyl dithioacetal.

7. A method of claim 2 wherein the sugar dialkyl dithioacetal is D-galactose dimethyl dithioacetal.

8. A method of claim 2 wherein the sugar dialkyl dithioacetal is D-galactose diethyl dithioacetal.

9. A method of claim 2 wherein the food product is selected from the group consisting of vegetable juices and broths.

10. A method of claim 2 wherein the food product is a vegetable juice comprising a mixture of the juices of at least tomato, carrot, celery, beets and watercress.

11. A method of claim 2 wherein the food product is a broth.

12. A method of claim 2 wherein the food product is tomato juice.

13. A composition comprising a food product and a sugar dialkyl dithioacetal of the formula:

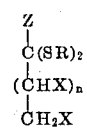

wherein R is selected from the group consisting of hydrogen and alkyl containing one to three carbon atoms, $n$ is an integer from 0 to 7, X is selected from the group consisting of hydrogen and hydroxyl wherein at least one X is hydroxyl and Z is selected from the group consisting of hydrogen and $-CH_2OH$.

14. A composition of claim 13 wherein $n$ is 4, X is hydroxyl and Z is hydrogen.

15. A composition of claim 14 wherein R is methyl.

16. A composition of claim 14 wherein R is ethyl.

17. A composition of claim 14 wherein the sugar dialkyl dithioacetal is D-glucose dimethyl dithioacetal.

18. A composition of claim 14 wherein the sugar dialkyl dithioacetal is D-glucose diethyl dithioacetal.

19. A composition of claim 14 wherein the sugar dialkyl dithioacetal is D-galactose dimethyl dithioacetal.

20. A composition of claim 14 wherein the sugar dialkyl dithioacetal is D-galactose diethyl dithioacetal.

21. A composition of claim 14 wherein the food product is selected from the group consisting of vegetable juices and broths.

22. A composition of claim 14 wherein the food product is a vegetable juice comprising a mixture of the juices of at least tomato, carrot, celery, beets and watercress.

23. A composition of claim 14 wherein the food product is a broth.

24. A composition of claim 14 wherein the food product is tomato juice.

25. A food product comprising a sugar dialkyl dithioacetal of the formula:

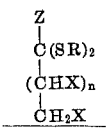

wherein R is selected from the group consisting of hydrogen and alkyl containing one to three carbon atoms, $n$ is an integer from 0 to 7, X is selected from the group consisting of hydrogen and hydroxyl wherein at least one X is hydroxyl and Z is selected from the group consisting of hydrogen and $-CH_2OH$.

* * * * *